(12) United States Patent
Kim et al.

(10) Patent No.: US 10,046,656 B2
(45) Date of Patent: Aug. 14, 2018

(54) BIDIRECTIONAL POWERING ON-BOARD CHARGER, VEHICLE POWER SUPPLY SYSTEM INCLUDING THE SAME, AND CONTROL METHOD THEREOF

(71) Applicant: Hyundai Motor Company, Seoul (KR)

(72) Inventors: Jee Heon Kim, Gyeonggi-Do (KR); Jun Yeon Park, Gyeonggi-do (KR); Ho Joong Lee, Gyeonggi-do (KR); Won Kyoung Choi, Gyeonggi-Do (KR); Dong Jun Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 168 days.

(21) Appl. No.: 15/275,110

(22) Filed: Sep. 23, 2016

(65) Prior Publication Data

US 2017/0320396 A1    Nov. 9, 2017

(30) Foreign Application Priority Data

May 4, 2016   (KR) .......................... 10-2016-0055333

(51) Int. Cl.
*B60L 11/18*        (2006.01)
*H02M 1/42*        (2007.01)
(Continued)

(52) U.S. Cl.
CPC ....... *B60L 11/1811* (2013.01); *B60L 11/1861* (2013.01); *H02M 1/42* (2013.01);
(Continued)

(58) Field of Classification Search
CPC ... B60L 11/1811; B60L 11/1861; H02M 1/42; H02M 3/04; H02M 7/04
(Continued)

(56) References Cited

U.S. PATENT DOCUMENTS 9,397,496 B2*   7/2016   Kang ................... B60L 11/1811
9,481,255 B2*   11/2016  Yim ..................... B60L 11/1809
(Continued)

FOREIGN PATENT DOCUMENTS

JP         2005-022561 A      1/2005
JP         10-1244939 B1      3/2012
(Continued)

*Primary Examiner* — Stacy Whitmore
(74) *Attorney, Agent, or Firm* — Mintz Levin Cohn Ferris Glovsky and Popeo, P.C.; Peter F. Corless (57) ABSTRACT

A vehicle power supply system is provided. The system includes a main battery and an OBC having first and second input/output terminals, in which AC power input to the first input/output terminal is converted into DC power to be output to the second input/output terminal, and a magnitude of the DC power input to the second input/output terminal is converted and output to the first input/output terminal. Additionally, the system includes an LDC in which a DC voltage input from the main battery is converted into a low voltage to be supplied to an auxiliary battery or an electronic load and a switching unit is connected between the first input/output terminal and the LDC. A controller is then configured to adjust a powering direction of the OBC and an on/off state of the switching unit, based on whether the main battery is charged and whether the LDC fails.

15 Claims, 4 Drawing Sheets

(51) Int. Cl.
   *H02M 3/04* (2006.01)
   *H02M 7/04* (2006.01)
(52) U.S. Cl.
   CPC ............... *H02M 3/04* (2013.01); *H02M 7/04* (2013.01); *B60L 2210/10* (2013.01); *B60L 2210/30* (2013.01)
(58) Field of Classification Search
   USPC ........................................................ 320/109
   See application file for complete search history.

(56) References Cited

U.S. PATENT DOCUMENTS

| | | | |
|---|---|---|---|
| 9,630,513 B2* | 4/2017 | Fietzek | B60L 11/1811 |
| 2013/0320922 A1* | 12/2013 | Acena | B60L 11/1811 |
| | | | 320/109 |
| 2016/0006346 A1* | 1/2016 | Satoh | H02M 1/4225 |
| | | | 320/109 |
| 2016/0159231 A1* | 6/2016 | Jefferies | B60L 11/1838 |
| | | | 320/109 |
| 2016/0347191 A1* | 12/2016 | Hayashigawa | B60L 11/1818 |
| 2017/0282747 A1* | 10/2017 | Wang | B60L 11/1868 |
| 2018/0029485 A1* | 2/2018 | Danner | B60L 11/1811 |
| 2018/0069424 A1* | 3/2018 | Yang | H02J 7/045 |

FOREIGN PATENT DOCUMENTS

| | | |
|---|---|---|
| JP | 2013-188101 A | 9/2013 |
| KR | 10-1551086 B1 | 9/2015 |
| KR | 10-2016-0038348 A | 4/2016 |

\* cited by examiner

BIDIRECTIONAL POWERING ON-BOARD CHARGER, VEHICLE POWER SUPPLY SYSTEM INCLUDING THE SAME, AND CONTROL METHOD THEREOF

CROSS REFERENCE TO RELATED APPLICATION

The present application claims priority of Korean Patent Application No. 10-2016-0055333 filed on May 4, 2016, the entire contents of which is incorporated herein for all purposes by this reference.

BACKGROUND

Field of the Invention

The present invention relates to a bidirectional powering on-board charger, a vehicle power supply system including the same, and a control method thereof, capable of supplying electric power from a main battery to an auxiliary battery and an electronic load using an on-board charger when a low-voltage direct current-direct current (DC-DC) converter for a vehicle is shut down.

Description of the Related Art

In general, an electric vehicle, which generates driving force by driving a motor using electric energy, includes a main battery which stores high-voltage power for the driving of the motor, and an low-voltage DC-DC Converter (LDC) which decreases the voltage of electric power for charging the main battery to supply low-voltage power to an auxiliary battery or electronic loads which are operated at low voltage.

When the LDC is shut down due to various causes while the vehicle is being driven, the auxiliary battery may not be charged and thus, electric power from the auxiliary battery to various electronic loads. As a result, the whole vehicle may be shut down due to difficulty of normal driving of the vehicle. Thus, when the LDC is shut down during while the vehicle is being driven, the supply of power to the important electronic load is cut off and the vehicle may be shut down. Accordingly, the risk of an accident may increase thus, influencing the durability of the auxiliary battery.

The foregoing is intended merely to aid in the understanding of the background of the present invention, and is not intended to mean that the present invention falls within the purview of the related art that is already known to those skilled in the art.

SUMMARY

Accordingly, the present invention provides a bidirectional powering on-board charger, a vehicle power supply system including the same, and a control method thereof, capable of supplying electric power from a main battery to an auxiliary battery and an electronic load using an on-board charger when a low-voltage DC-DC converter for a vehicle is shut down.

In accordance with one aspect of the present invention, a bidirectional powering on-board charger may include a first input/output terminal connected to electric vehicle supply equipment (EVSE) to input alternating current (AC) power to the first input/output terminal when a vehicle is charged, a rectifier circuit unit configured to rectify the AC power input from the first input/output terminal, a power factor correction circuit unit configured to correct a power factor of the power rectified by the rectifier circuit unit, a DC-DC conversion circuit unit configured to convert a voltage of the power output from the power factor correction circuit unit, and a second input/output terminal connected to a main battery of the vehicle to apply the voltage converted by the DC-DC conversion circuit unit to the main battery through the second input/output terminal In particular, the DC-DC conversion circuit unit is a bidirectional DC-DC conversion circuit unit and the voltage of the main battery may be converted and output to the power factor correction circuit unit. The power factor correction circuit unit is a buck-boost converter, and the rectifier circuit unit may include a plurality of switching elements in which the voltage input from the power factor correction circuit unit may be applied to the first input/output terminal.

The rectifier circuit unit may include a plurality of switching elements having internal diodes. The DC-DC conversion circuit unit may include first and second bidirectional DC-AC conversion parts having a plurality of switching elements, and a transformer having primary and secondary coils connected to the respective first and second bidirectional DC-AC conversion parts.

In accordance with another aspect of the present invention, a vehicle power supply system may include a main battery, an on-board charger (OBC) having a first input/output terminal connected to EVSE and a second input/output terminal connected to the main battery, the OBC being configured such that AC power input to the first input/output terminal may be converted into DC power to be output to the second input/output terminal, and a magnitude of the DC power input to the second input/output terminal may be converted and output to the first input/output terminal, an LDC configured such that a DC voltage may be input from the main battery and the input DC voltage may be converted into a low voltage to be supplied to an auxiliary battery or an electronic load of a vehicle, a switching unit connected between the first input/output terminal and the LDC, and a controller configured to adjust a powering direction of the OBC and an on/off state of the switching unit, based on whether the main battery is charged by the OBC and whether the LDC fails.

When a failure or malfunction of the LDC is determined, the controller may be configured to turn on the switching unit and operate the OBC to convert power for charging the main battery and output to the first input/output terminal by the OBC. The controller may further be configured to operate the OBC to maintain the voltage of the first input/output terminal to be greater than a voltage of the auxiliary battery connected to an output terminal of the LDC. When a predetermined de-rating condition is established based on a current/temperature/SOC of the auxiliary battery and a current/temperature of the OBC, the controller may be configured to limit the current of the OBC.

The OBC may include a rectifier circuit unit configured to rectify the AC power input from the first input/output terminal, a power factor correction circuit unit configured to correct (e.g., adjust) a power factor of the power rectified by the rectifier circuit unit, and a DC-DC conversion circuit unit in which a voltage of the power output from the power factor correction circuit unit may be converted and output to the second input/output terminal, wherein the DC-DC conversion circuit unit may be a bidirectional DC-DC conversion circuit unit in which the voltage of the main battery may be converted and output to the power factor correction circuit unit, the power factor correction circuit unit may be a buck-boost converter, and the rectifier circuit unit may include a plurality of switching elements in which the voltage input from the power factor correction circuit unit may be applied to the first input/output terminal.

The rectifier circuit unit may include a plurality of switching elements having internal diodes, and the switching elements may be turned on/off by the controller. The DC-DC conversion circuit unit may include first and second bidirectional DC-AC conversion parts having a plurality of switching elements, and a transformer having primary and secondary coils connected to the respective first and second bidirectional DC-AC conversion parts, and the controller may be configured to operate duties of the switching elements provided in the first and second bidirectional DC-AC conversion parts, to adjust a magnitude of the voltage applied to the second input/output terminal during charging and to adjust a magnitude of the voltage applied to the first input/output terminal when a failure or malfunction of the LDC is determined.

In accordance with a further aspect of the present invention, a method of controlling a vehicle power supply system may include determining whether an LDC of a vehicle fails by a controller, electrically connecting a first input/output terminal of an OBC and an output terminal of the LDC by the controller when the LDC is determined to fail, the OBC having the first input/output terminal connected to EVSE and a second input/output terminal connected to a main battery of the vehicle, AC power input to the first input/output terminal may be converted into DC power to be output to the second input/output terminal, and a magnitude of the DC power input to the second input/output terminal may be converted and output to the first input/output terminal, and operating the OBC by the controller to convert power for charging the main battery and output to the first input/output terminal by the OBC.

As apparent from the above description, in accordance with the bidirectional powering on-board charger, the vehicle power supply system including the same, and the control method thereof, it may be possible to prevent accidents by preventing the whole vehicle from being shut down and securing the driving performance of the vehicle since electric power for charging the main battery may be supplied to the auxiliary battery and the electronic load by the on-board charger for charging the main battery even though the LDC is shut down while the vehicle is being driven.

In addition, in accordance with the bidirectional powering on-board charger, the vehicle power supply system including the same, and the control method thereof, it may be possible to secure the durability of the auxiliary battery by providing the current de-rating function according to the current/temperature/SOC of the auxiliary battery and the current/temperature of the on-board charger when electric power is supplied to the auxiliary battery and the electronic load by the on-board charger.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

A bidirectional powering on-board charger, a vehicle power supply system including the same, and a control method thereof according to the exemplary embodiments of the present invention will be described below with reference to the accompanying drawings.

Figure 1:
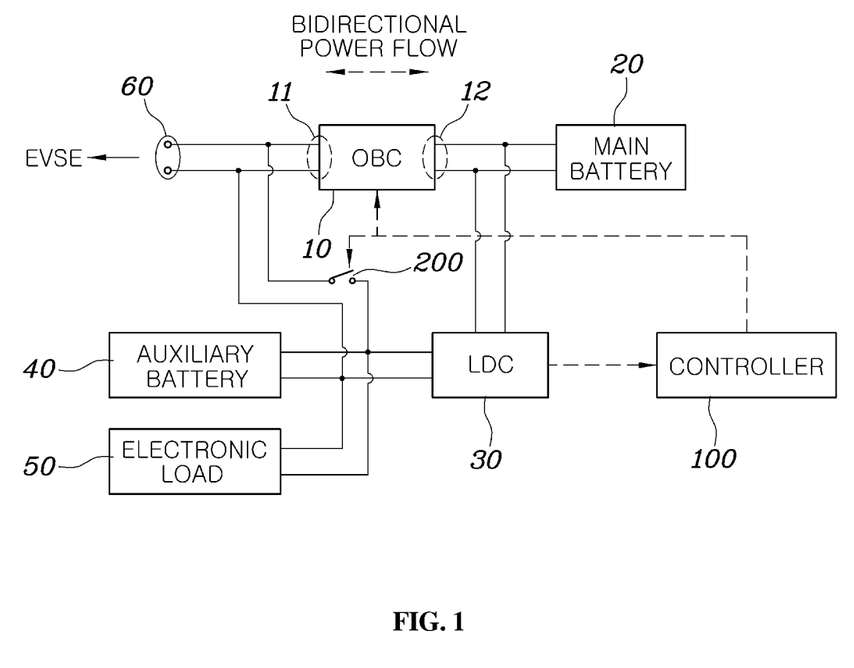
FIG. 1 is a block diagram illustrating a vehicle power supply system including a bidirectional powering on-board charger according to an exemplary embodiment of the present invention.

FIG. 1 is a block diagram illustrating a vehicle power supply system including a bidirectional powering on-board charger according to an exemplary embodiment of the present invention. Referring to FIG. 1, the vehicle power supply system according to the exemplary embodiment of the present invention may include a main battery 20, an on-board charger (OBC) 10, a low-voltage DC-DC converter (LDC) 30, and a switching unit 200. Additionally, a controller may be configured to operate the various components of the system.

The main battery 20 is a component configured to supply high-current power to an electric motor or the like in an eco-friendly vehicle such as a plug-in hybrid vehicle or an electric vehicle driven by electric energy. The main battery 20 may be charged with electric power supplied from external electric vehicle service equipment (EVSE) through the OBC 10. In addition, the main battery 20 may be configured to supply the electric power stored therein to the drive motor of the vehicle when the vehicle is driven, and supply the electric power to an auxiliary battery 40 and/or an electronic load 50 mounted within the vehicle. The main battery 20 may be referred to as a high-voltage battery.

In the exemplary embodiment, the vehicle power supply system may include the OBC 10, particularly a bidirectional powering OBC configured to charge the main battery 20. In other words, the OBC 10 applied in the exemplary embodiment of the present invention is a bidirectional powering OBC having a first input/output terminal 11 connected to the EVSE and a second input/output terminal 12 connected to the main battery 20 of the vehicle. The bidirectional powering OBC may be configured to convert AC power input to the first input/output terminal 11 into DC power to output the DC power to the second input/output terminal 12, and convert the magnitude of the DC power input to the second input/output terminal 12 to output the converted DC power to the first input/output terminal 11.

Although not illustrated, relays may be respectively disposed between the first input/output terminal 11 of the OBC 10 and a charging socket 60 and between the second input/output terminal 12 and the main battery 20 to electric connect/disconnect the components. In the typical eco-friendly vehicle, the relays disposed between the first input/output terminal 11 and the charging socket 60 and between the second input/output terminal 12 and the main battery 20 may also be referred to as a secondary relay and a primary relay, respectively. Although not illustrated, a relay may be disposed at the output terminal of the main battery 20 to connect and disconnect output to and from the main battery 20, and the relay may be referred to as a main relay.

The primary and secondary relays and the main relay may be turned on/off as occasion demands. For example, the primary and secondary relays may be turned on when it is necessary to convert electric power using the OBC 10, and the main relay may be turned on when it is necessary to charge the main battery 20 and to use the electric power stored in the main battery 20. The OBC 10 may include the first input/output terminal 11 connected to the EVSE and the second input/output terminal 12 connected to the main battery 20 of the vehicle. The OBC 10 may be configured to convert AC power input to the first input/output terminal 11 into DC power to output the DC power to the second input/output terminal 12, and convert the magnitude of the DC power input to the second input/output terminal 12 to output the converted DC power to the first input/output terminal 11.

For example, when the main battery 20 of the vehicle is charged, an outlet disposed at the charging cable of the external EVSE may be fastened or coupled to the charging socket 60 of the vehicle to allow the primary and secondary relays and the main relay to be turned on by a controller 100, and the AC power supplied from the external EVSE may be converted into AC power to be supplied to the main battery 20 by the OBC 10. In such a charging process, the controller 100 may be configured to execute the duties of various switching elements disposed in the OBC 10, and simultaneously operate the OBC 10 to maintain the primary voltage of the OBC 10 to be greater than the voltage of the main battery 20.

As another example, when the ignition of the vehicle is turned on and the LDC 30 of the vehicle is operated normally (e.g., without failure or malfunction), the primary and secondary relays and the main relay may be turned on by the controller 100 since it is unnecessary to operate the OBC 10. Electric power may be supplied from the main battery 20 to the LDC 30 and the LDC 30 may be configured to convert the voltage of the electric power supplied from the main battery 20 to supply the converted power to the auxiliary battery and the electronic load 50. Further, the controller 100 may be configured to execute the duties of the switching elements disposed in the LDC 30 to maintain the output voltage of the LDC 30 (e.g., the secondary voltage of the LDC) to be greater than the voltage of the auxiliary battery even in such a charging process.

Additionally, when the ignition of the vehicle is turned on and the LDC 30 of the vehicle is shut down while the vehicle is being driven, the primary and secondary relays and the main may be are turned on by the controller 100, and the controller 100 may be configured to execute the duties of the switching elements disposed in the OBC 10 to allow the OBC 10 to convert electric power input to the second input/output terminal 12 for charging the main battery 20 to supply the converted power to the first input/output terminal 11.

Figure 2:
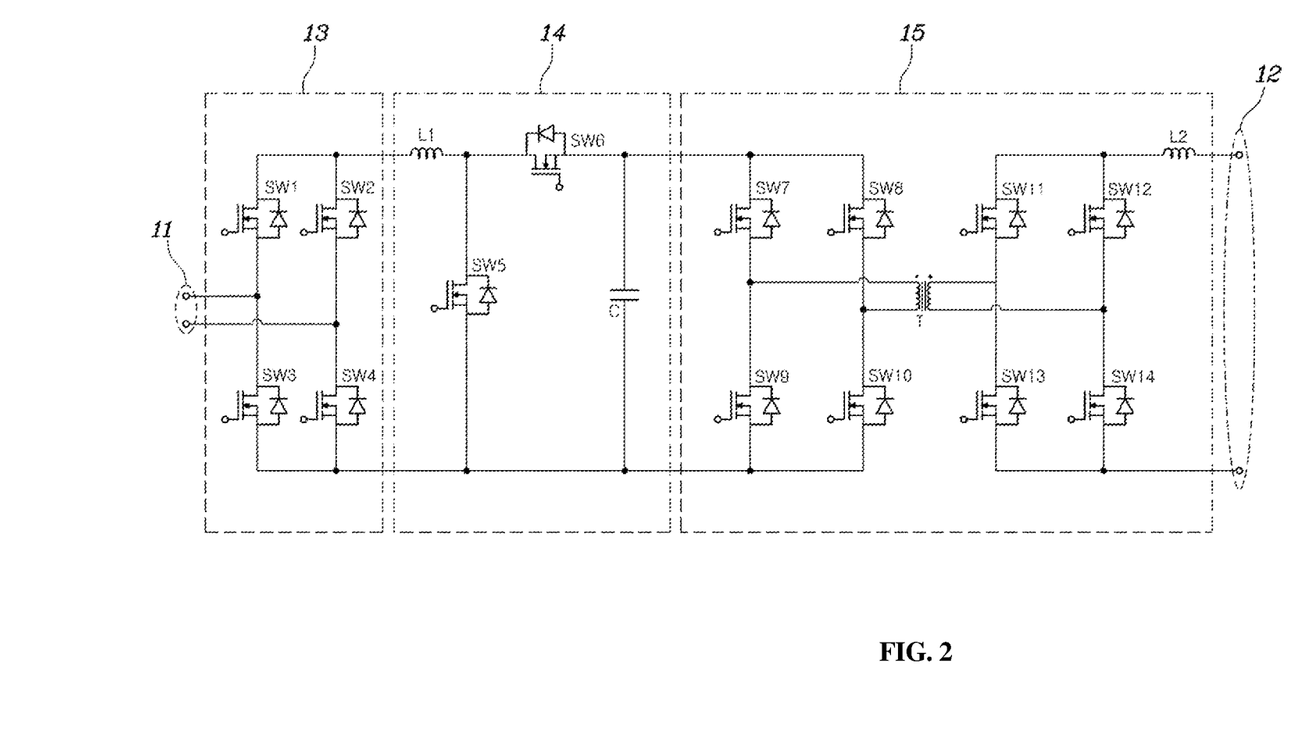
FIG. 2 is a circuit diagram illustrating a bidirectional powering on-board charger according to an exemplary embodiment of the present invention.

FIG. 2 is a circuit diagram illustrating a bidirectional powering OBC according to an exemplary embodiment of the present invention. Referring to FIG. 2, the bidirectional powering OBC according to the exemplary embodiment of the present invention may include a first input/output terminal 11, a second input/output terminal 12, a rectifier circuit unit 13, a power factor correction circuit unit 14, and a DC-DC conversion circuit unit 15.

In the exemplary embodiment, the rectifier circuit unit 13 may be configured to rectify AC power input from the first input/output terminal 11 when the main battery 20 is charged. Although a typical full-wave rectifier circuit configured by four diodes may be adopted as the rectifier circuit unit 13, the rectifier circuit unit 13 may be embodied as a plurality of switching elements SW1 to SW4 having internal diodes (e.g. MOSFETs) in the exemplary embodiment of the present invention.

The rectifier circuit unit 13 included in the bidirectional powering OBC according to the exemplary embodiment of the present invention may be configured to perform a bidirectional operation in which full-wave rectifies an AC voltage input from the first input/output terminal 11 when the main battery 20 is charged to transfer the rectified DC voltage to the main battery 20 while transferring the DC voltage from the main battery 20 to the first input/output terminal 11 when the LDC 30 is shut down. In other words, during charging, the switching elements SW1 to SW4 may be maintained in an off state, and the internal diodes of the respective switching elements SW1 to SW4 may be operated as rectification diodes. In addition, when the DC power is output to the first input/output terminal 11, the switching elements SW1 and SW4 may be turned on and the switching elements SW2 and SW3 may be turned off, and thus, the voltage transferred from the main battery 20 may be applied to the first input/output terminal 11.

Alternatively, the controller 100 may also be configured to turn on/off the switching elements SW1 and SW4 based on the state of the AC voltage applied to the first input/output terminal 11 during charging. Accordingly, the controller 100 may be configured to execute full-wave rectification by monitoring the AC voltage applied to the first input/output terminal 11, that is, by operating the switching elements to turn on the switching elements SW1 and SW4 and turn off the switching elements SW2 and SW3 when the (+) voltage is applied thereto, and by operating the switching elements to turn on the switching elements SW2 and SW3 and turn off the switching elements SW1 and SW4 when the (−) voltage is applied thereto.

The power factor correction circuit unit 14 is a component for correcting the power factor of electric power rectified by the rectifier circuit unit 13 during charging. In a typical unidirectional OBC, the power factor correction circuit unit 14 may be embodied as a boost converter and a rectifying capacitor C to convert and increase the voltage transferred from the rectifier circuit unit 13. The boost converter may produce a stable direct current to transfer the current to the DC-DC conversion circuit unit 15 provided to the main battery 20 and simultaneously adjust the current input thereto, and thus, the input power factor may be maintained to be equal to or greater than a specified value.

In the exemplary embodiment, a buck-boost converter may be used as the power factor correction circuit unit 14. In other words, when the OBC 10 charges the main battery 20, the power factor correction circuit unit 14 may function as the boost converter and the duty of a switching element SW5 may be adjusted by the controller and the internal diode of a switching element SW6 may be operated by turning off the switching element SW6. In addition, when the DC power is output to the first input/output terminal 11, the switching element SW5 may be turned off and the internal diode thereof may be operated while the duty of the switching element SW6 is adjusted by the controller and the switching elements SW2 and SW3 are turned off. As a result, the voltage transferred to the first input/output terminal 11 from the main battery 20 may be decreased and transferred to the rectifier circuit unit 13.

The DC-DC conversion circuit unit 15 may be embodied as a bidirectional DC-DC conversion circuit unit configured to convert the voltage of electric power output from the power factor correction circuit unit 14 to supply the same to the second input/output terminal 12, or convert the voltage of the main battery 20 applied to the second input/output terminal 12 to output the same to the power factor correction circuit unit 14. The DC-DC conversion circuit unit 15 may be an isolated DC-DC conversion circuit having a transformer T therein, and may include bidirectional DC-AC conversion circuits which are respectively embodied as a plurality of switching elements SW7 to SW14 at the primary and secondary sides of the transformer T.

For example, when the main battery 20 is charged, the DC voltage transferred from the power factor correction circuit unit 14 may be turned on/off by the interchange of the switching elements SW7 and SW10 and the switching elements SW8 and SW9 to be converted into an AC voltage, and the AC voltage may be applied to the secondary coil of the transformer T (e.g., the main battery side is referred to as a primary side and the external EVSE side is referred to as a secondary side in the exemplary embodiment). The transformer T output an AC voltage transformed according to the winding ratio thereof to a secondary coil which is at the main battery side, and the AC voltage may be turned on/off by the interchange of the switching elements SW11 and SW14 and the switching elements SW12 and SW13 to provide a desired magnitude of voltage to the main battery 20.

Even when the voltage at the main battery side is output to the first input/output terminal 11, the switching elements SW7 to SW14 may be configured to perform a similar operation during charging although only the transfer direction of energy is changed. Of course, the on/off state of the switching elements SW7 to SW14 may be adjusted by the controller 100. Particularly, the duties of the switching elements SW11 and SW14 and the switching elements SW12 and SW13 may be adjusted by the controller 100, and the magnitude of voltage transferred to the second input/output terminal 12 may thus be adjusted during charging. In addition, when electric power for charging the main battery 20 is supplied to the first input/output terminal 11, the magnitude of voltage transferred to the first input/output terminal 11 may be adjusted.

Referring to FIG. 1 again, the vehicle power supply system according to the exemplary embodiment of the present invention may include the switching unit 200 which electrically connects/disconnects the first input/output terminal 11 of the OBC 10 and the output terminal of the LDC 30. The on/off state of the switching unit 200 may be adjusted by the controller 100 and thus, when the LDC 30 is shut down, the electric power output from the main battery 20 may be supplied to the auxiliary battery 40 and the electronic load 50 connected to the output terminal (the secondary side) of the LDC 30. In other words, the switching unit 200 may be maintained in an off state when the main battery 20 is charged or the LDC 30 is operated normally (e.g., without error, failure, or malfunction), and the switching unit 200 may be turned on when the LDC 30 is shut down to supply the power of the main battery 20 converted by the OBC 10 to the auxiliary battery 40 and the electronic load 50. The switching unit 200 may be embodied as a relay, and may be referred to as an external relay to distinguish it from other relays.

Figure 3:
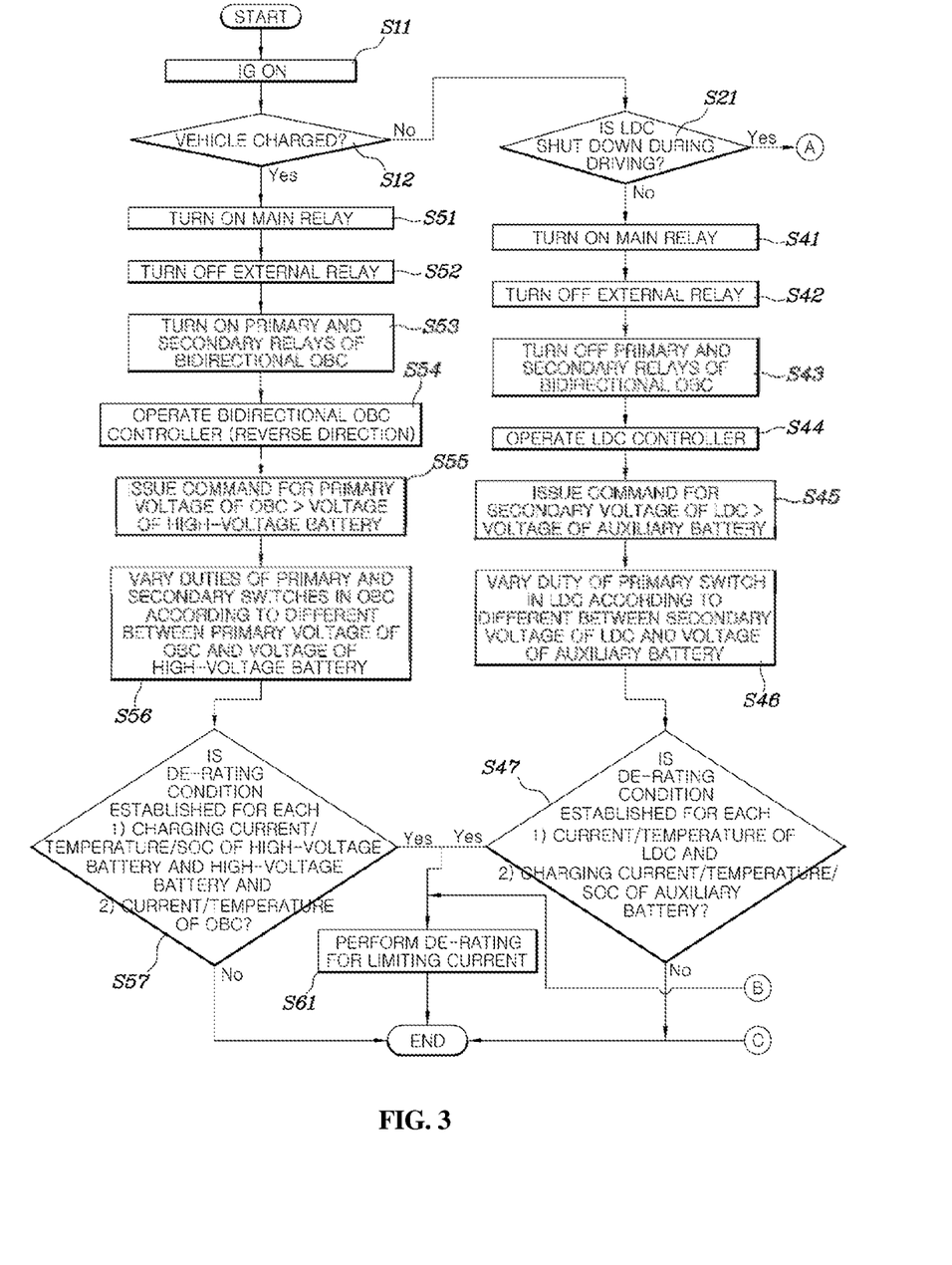
FIGS. 3 and 4 are flowcharts illustrating a method of controlling a vehicle power supply system including a bidirectional powering on-board charger according to an exemplary embodiment of the present invention.
Figure 4:
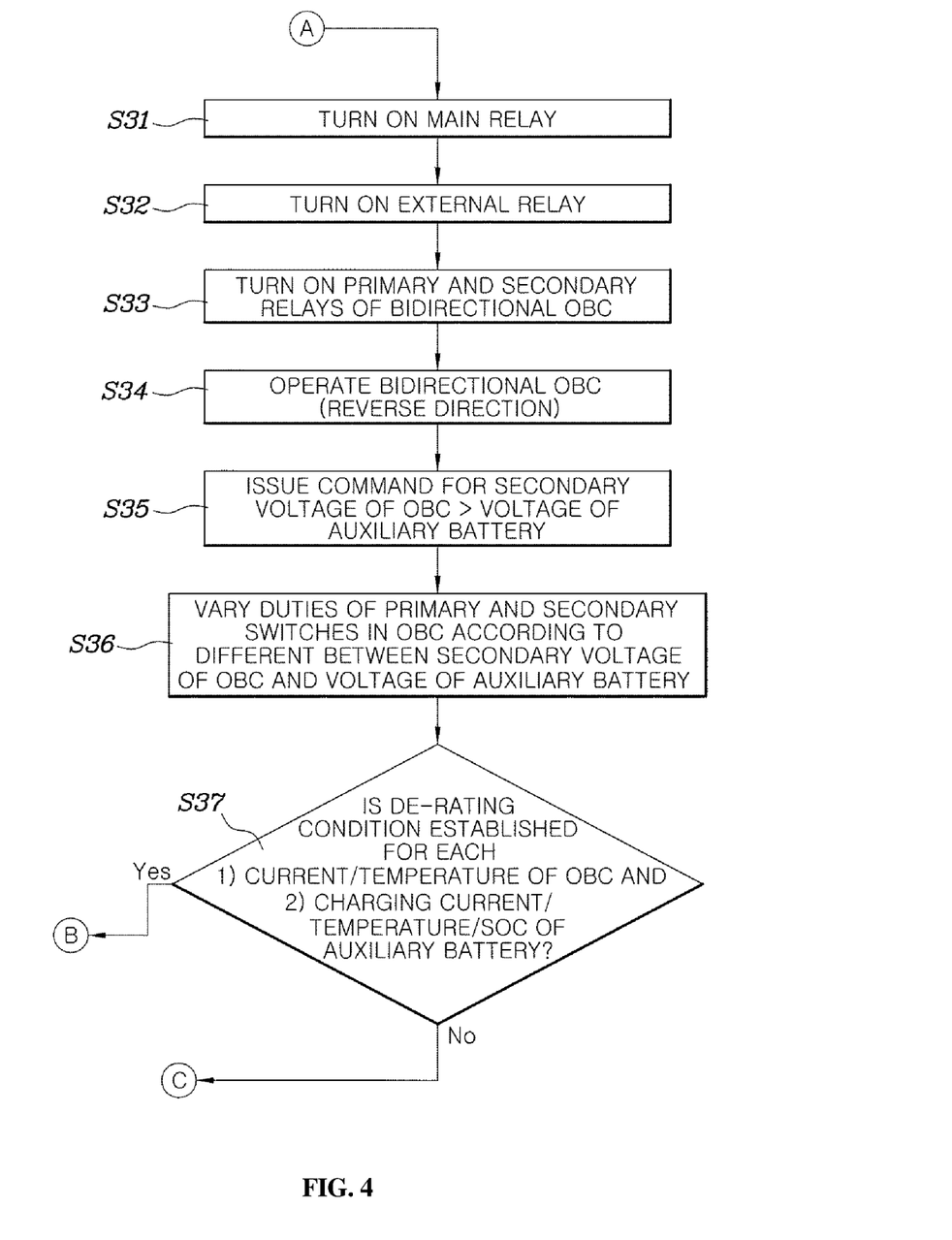

FIGS. 3 and 4 are flowcharts illustrating a method of controlling the vehicle power supply system including the bidirectional powering OBC according to an exemplary embodiment of the present invention. In particular, FIG. 3 illustrates the control method when the main battery 20 is charged or the LDC 30 is operated normally while the vehicle is being driven, and FIG. 4 illustrates the control method when the LDC 30 is shut down during the driving of the vehicle.

Referring to FIG. 3, first, when the ignition of the vehicle is turned on (S11) and the controller 100 determines that the vehicle is charged (S12), the controller 100 may be configured to turn on the main relay (S51), turn off the external relay (the switching unit) 200 (S52), and turn on the primary and secondary relays of the OBC 10 (S53). The controller 100 may then be configured to operate the OBC 10 (S54), and increase the primary voltage of the OBC 10 (i.e. the voltage of the second input/output terminal 12) to be greater than the voltage of the main battery (the high-voltage main battery) 20 to charge the main battery 20 (S55). Further, the controller 100 may be configured to variably execute the duties of the switching elements within the OBC 10 based on the difference between the primary voltage of the OBC 10 (i.e. the voltage of the second input/output terminal 12) and the voltage of the main battery (the high-voltage main battery) 20 in the charging process (S56).

In addition, the controller 100 may be configured to determine whether a predetermined de-rating condition is established based on the charging current, temperature, and state of charge (SOC) of the main battery 20, the current and temperature of the OBC 10, and the like (S57). When the de-rating condition is established, the controller 100 may be configured to perform de-rating for limiting the charging current (S61). Accordingly, the controller 100 may be configured to receive and monitor information regarding the charging current, temperature, and SOC of the main battery 20, the current and temperature of the OBC 10, etc.

Meanwhile, when the ignition of the vehicle is turned on (S11) and the controller 100 determines that the vehicle is not charged (S12), the controller 100 may be configured to determine whether the LDC 30 is shut down (S21). The controller 100 may also be configured to determine whether the LDC is shut down using controller area network (CAN) communication in other controllers such as an electronic control unit (ECU) of the vehicle. When the LDC 20 is determined to be operated normally, the controller 100 may be configured to turn on the main relay (S41), turn off the external relay (the switching unit) 200 (S42), and turn off the primary and secondary relays of the OBC 10 to open the first and second input/output terminals 11 and 12 (S43).

Further, the controller 100 may be configured to operate another LDC controller to operate the LDC 30 through CAN communication (S44). The LDC controller may issue a command to set the output voltage (the secondary voltage) of the LDC 30 to be greater than the voltage of the auxiliary battery 40 to charge the auxiliary battery 40 (S45). The LDC controller may be configured to variably perform the duties of the switching elements in the LDC based on the difference between the secondary voltage (the output voltage) of the LDC 30 and the voltage of the auxiliary battery 40 (S46). In addition, the LDC controller may be configured to determine whether a de-rating condition is established based on the current and temperature of the LDC 30, the charging current, temperature, and SOC of the auxiliary battery 40, and the like (S47). When the de-rating condition is established, the LDC controller may be configured to perform de-rating for limiting the charging current (S61).

Referring to FIG. 4, when the LDC 30 is determined to be shut down, the controller 100 may be configured to turn on the main relay (S31), turn on the external relay (the switching unit) 200 (S32), and turn on the primary and secondary relays of the OBC 10 (S33). The controller 100 may then be configured to operate the OBC 10 (S34), and operate the OBC 10 to set the secondary voltage of the OBC 10 (i.e. the voltage of the first input/output terminal 11) to be greater than the voltage of the auxiliary battery 40 to charge the auxiliary battery 40 (S35).

Further, the controller 100 may be configured to variably execute the duties of the switching elements disposed within the OBC 10 based on the difference between the secondary voltage of the OBC 10 (i.e. the voltage of the first input/output terminal 11) and the voltage of the auxiliary battery 40 in the charging process, and thus, the secondary voltage of the OBC 10 (i.e. the voltage of the first input/output terminal 11) may be maintained to be greater than the voltage of the auxiliary battery 40 (S36). In addition, the controller 100 may be configured to determine whether a de-rating condition is established based on the charging current, temperature, and SOC of the auxiliary battery 40, the current and temperature of the OBC 10, and the like (S37). When the de-rating condition is established, the controller 100 may be configured to perform de-rating for limiting the charging current (S61).

As described above, in accordance with the bidirectional powering OBC, the vehicle power supply system including the same, and the control method thereof according to the exemplary embodiments of the present invention, it may be possible to prevent accidents by preventing the whole vehicle from being shut down and securing the driving performance of the vehicle since electric power for charging the main battery may be supplied to the auxiliary battery and the electronic load by the OBC for charging the main battery even though the LDC is shut down while the vehicle is being driven.

In addition, in accordance with the bidirectional powering OBC, the vehicle power supply system including the same, and the control method thereof according to the exemplary embodiments of the present invention, it may be possible to secure the durability of the auxiliary battery by providing the current de-rating function according to the current/temperature/SOC of the auxiliary battery and the current/temperature of the OBC when electric power is supplied to the auxiliary battery and the electronic load by the OBC.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A bidirectional powering on-board charger, comprising:
a first input/output terminal connected to electric vehicle service equipment (EVSE) to input alternating current (AC) power to the first input/output terminal when a vehicle is charged;
a rectifier circuit unit configured to rectify the AC power input from the first input/output terminal;
a power factor correction circuit unit configured to correct a power factor of the power rectified by the rectifier circuit unit;
a direct current-direct current (DC-DC) conversion circuit unit configured to convert a voltage of the power output from the power factor correction circuit unit; and
a second input/output terminal connected to a main battery of the vehicle to apply the voltage converted by the DC-DC conversion circuit unit to the main battery through the second input/output terminal,
wherein the DC-DC conversion circuit unit is a bidirectional DC-DC conversion circuit unit configured in which the voltage of the main battery is converted and output to the power factor correction circuit unit;
wherein the power factor correction circuit unit is a buck-boost converter; and
wherein the rectifier circuit unit includes a plurality of switching elements in which the voltage input from the power factor correction circuit unit is applied to the first input/output terminal.

2. The bidirectional powering on-board charger according to claim 1, wherein the rectifier circuit unit includes a plurality of switching elements having internal diodes.

3. The bidirectional powering on-board charger according to claim 1, wherein the DC-DC conversion circuit unit includes first and second bidirectional DC-AC conversion parts having a plurality of switching elements, and a transformer having primary and secondary coils connected to the respective first and second bidirectional DC-AC conversion parts.

4. A vehicle power supply system, comprising:
a main battery;
an on-board charger (OBC) having a first input/output terminal connected to electric vehicle service equipment (EVSE) and a second input/output terminal connected to the main battery, in which alternating current (AC) power input to the first input/output terminal is converted into direct current (DC) power to be output to the second input/output terminal, and a magnitude of the DC power input to the second input/output terminal is converted and output to the first input/output terminal;

a lower voltage DC-DC converter (LDC) in which a DC voltage is input from the main battery and the input DC voltage is converted into a low voltage to be supplied to an auxiliary battery or an electronic load of a vehicle;

a switching unit connected between the first input/output terminal and the LDC; and a controller configured to adjust a powering direction of the OBC and an on/off state of the switching unit, based on whether the main battery is charged by the OBC and whether the LDC fails.

5. The vehicle power supply system according to claim 4, wherein, when the LDC is determined to fail, the controller is configured to turn on the switching unit and operate the OBC to convert power for charging the main battery and output to the first input/output terminal by the OBC.

6. The vehicle power supply system according to claim 5, wherein the controller is configured to operate the OBC to maintain the voltage of the first input/output terminal to be greater than a voltage of the auxiliary battery connected to an output terminal of the LDC.

7. The vehicle power supply system according to claim 6, wherein, when a predetermined de-rating condition is established based on a current, temperature, and state of charge (SOC) of the auxiliary battery and a current and temperature of the OBC, the controller is configured to limit the current of the OBC.

8. The vehicle power supply system according to claim 5, wherein the OBC includes:
a rectifier circuit unit configured to rectify the AC power input from the first input/output terminal;
a power factor correction circuit unit configured to correct a power factor of the power rectified by the rectifier circuit unit; and
a DC-DC conversion circuit unit in which a voltage of the power output from the power factor correction circuit unit is converted and output to the second input/output terminal,
wherein the DC-DC conversion circuit unit is a bidirectional DC-DC conversion circuit unit in which the voltage of the main battery is converted and output to the power factor correction circuit unit,
wherein the power factor correction circuit unit is a buck-boost converter, and
wherein the rectifier circuit unit includes a plurality of switching elements in which the voltage input from the power factor correction circuit unit is applied to the first input/output terminal.

9. The vehicle power supply system according to claim 8, wherein the rectifier circuit unit includes a plurality of switching elements having internal diodes, and the switching elements are operated to be turned on and off by the controller.

10. The vehicle power supply system according to claim 8, wherein:
the DC-DC conversion circuit unit includes first and second bidirectional DC-AC conversion parts having a plurality of switching elements, and a transformer having primary and secondary coils connected to the respective first and second bidirectional DC-AC conversion parts; and
the controller is configured to execute duties of the switching elements disposed in the first and second bidirectional DC-AC conversion parts, to adjust a magnitude of the voltage applied to the second input/output terminal during charging and to adjust a magnitude of the voltage applied to the first input/output terminal when the LDC is determined to fail.

11. A method of controlling a vehicle power supply system, comprising:
determining, by a controller, whether a low voltage direct current-direct current converter (LDC) of a vehicle fails;
electrically connecting, by the controller a first input/output terminal of an on-board charger (OBC) and an output terminal of the LDC when the LDC is determined to fail, the OBC having the first input/output terminal connected to electric vehicle service equipment (EVSE) and a second input/output terminal connected to a main battery of the vehicle, and alternating current (AC) power input to the first input/output terminal is converted into direct current (DC) power to be output to the second input/output terminal, and a magnitude of the DC power input to the second input/output terminal is converted and output to the first input/output terminal; and
operating, by the controller, the OBC to convert power for charging the main battery and output to the first input/output terminal by the OBC.

12. The method according to claim 11, wherein in the operating of the OBC, a voltage of the first input/output terminal is maintained to be greater than a voltage of an auxiliary battery connected to the output terminal of the LDC.

13. The method according to claim 12, wherein in the operating of the OBC, when a predetermined de-rating condition is established based on a current, temperature, and state of charge (SOC) of the auxiliary battery and a current and temperature of the OBC, the controller is configured to limit the current of the OBC.

14. The method according to claim 11, wherein the OBC includes:
a rectifier circuit unit configured to rectify the AC power input from the first input/output terminal;
a power factor correction circuit unit configured to correct a power factor of the power rectified by the rectifier circuit unit; and
a DC-DC conversion circuit unit in which a voltage of the power output from the power factor correction circuit unit is converted and output to the second input/output terminal,
wherein the DC-DC conversion circuit unit is a bidirectional DC-DC conversion circuit unit in which a voltage of the main battery is converted and output to the power factor correction circuit unit,
wherein the power factor correction circuit unit is a buck-boost converter, and
wherein the rectifier circuit unit includes a plurality of switching elements in which the voltage input from the power factor correction circuit unit is applied to the first input/output terminal.

15. The method according to claim 14, wherein:
the DC-DC conversion circuit unit includes first and second bidirectional DC-AC conversion parts having a plurality of switching elements, and a transformer having primary and secondary coils connected to the respective first and second bidirectional DC-AC conversion parts; and
in the operating of the OBC, duties of the switching elements disposed in the first and second bidirectional DC-AC conversion parts are operated to adjust a magnitude of the voltage applied to the second input/output terminal during charging and to adjust a magnitude of the voltage applied to the first input/output terminal when the LDC is determined to fail.

\* \* \* \* \*